United States Patent [19]
DaCosta et al.

[11] Patent Number: 6,042,960
[45] Date of Patent: Mar. 28, 2000

[54] AUTOMATIC WATER VAPOR DENSITY CONTROL OF HYDROGEN GAS

[75] Inventors: David H. DaCosta, West Milford, N.J.; P. Mark Golben, Florida, N.Y.

[73] Assignee: Ergenics, Inc., Ringwood, N.J.

[21] Appl. No.: 08/950,897

[22] Filed: Oct. 15, 1997

[51] Int. Cl.[7] .................................................. H01M 10/52
[52] U.S. Cl. .............................. 429/53; 429/58; 429/101
[58] Field of Search ................................ 429/53, 58, 101, 429/61, 54

[56] References Cited

U.S. PATENT DOCUMENTS

| | | | |
|---|---|---|---|
| 5,250,368 | 10/1993 | Golben et al. | 429/17 |
| 5,264,301 | 11/1993 | Sindorf et al. | 429/53 |
| 5,532,074 | 7/1996 | Golben | 429/53 |
| 5,688,611 | 11/1997 | Golben | 429/53 |

Primary Examiner—Anthony Skapars
Attorney, Agent, or Firm—Dorn, McEachran, Jambor & Keating; Vangelis Economou

[57] ABSTRACT

An apparatus for and method of isolating an enclosed metal hydride container from an apparatus which uses hydrogen gas during periods of dormant or inactive storage of the device, including a constricted opening having a dual one way check valve arrangement to selectively open or close the hydrogen gas communication between the hydrogen storage container and the apparatus using the hydrogen. The dual check valve arrangement provides for constricting hydrogen gas flow between the chambers unless the device is in the process of charging or discharging, either of which process causes a differential pressure to develop across the dual check valve arrangement which is greater than a predetermined threshold pressure, e.g., 1–2 p.s.i. The hydrogen storage material within the hydrogen storage container comprises mixture of metal hydride particles with interspersed water adsorbing particles, such as silica gel desiccant.

9 Claims, 2 Drawing Sheets

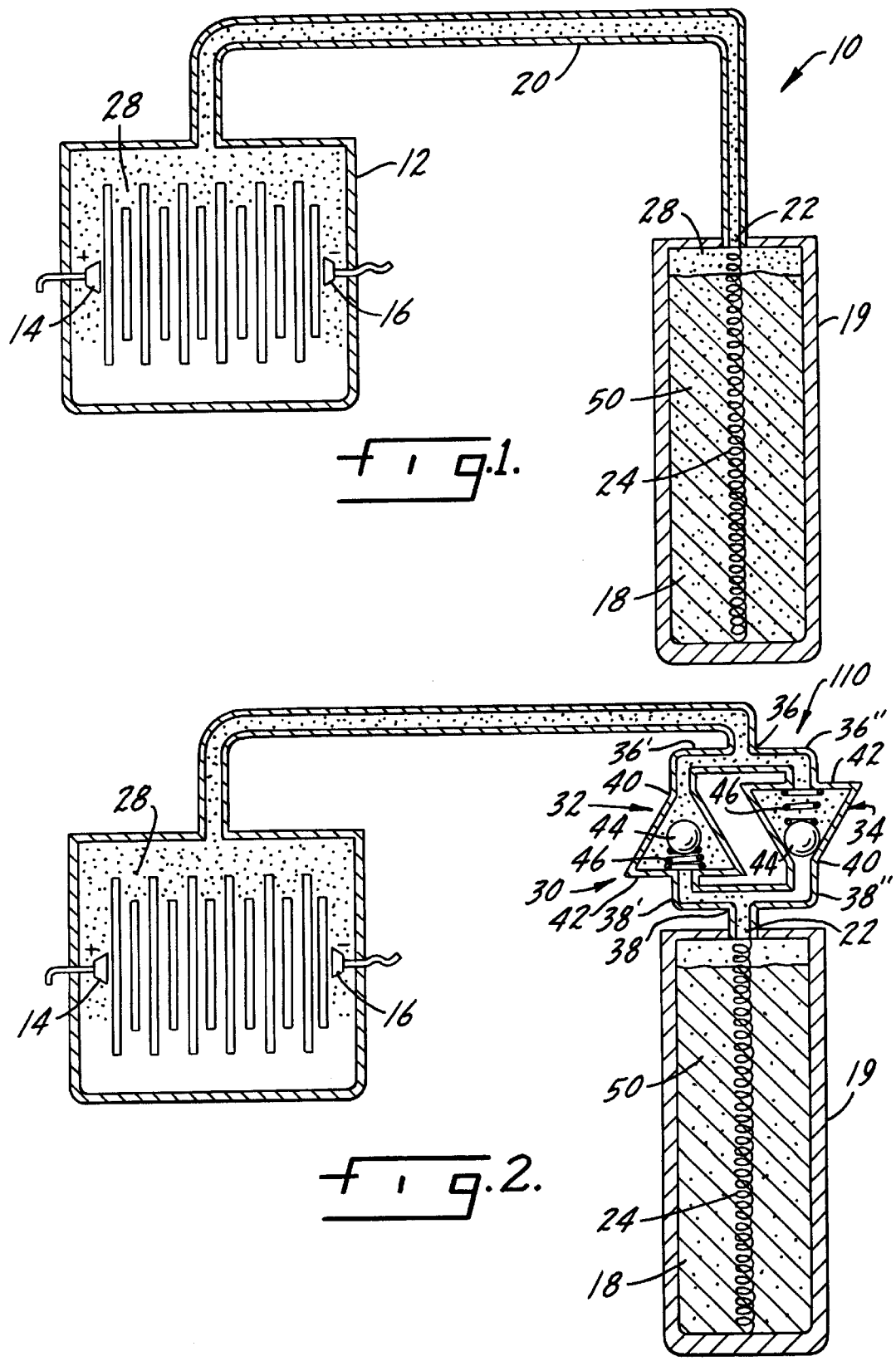

AUTOMATIC WATER VAPOR DENSITY CONTROL OF HYDROGEN GAS

CROSS REFERENCE TO RELATED APPLICATION

This invention is related to U.S. patent application Ser. No. 08/673,104, filed on Jul. 1, 1996, now U.S. Pat. No. 5,688,611, as an improvement thereof.

BACKGROUND OF THE INVENTION

1. Field of the Invention

The present invention relates generally to hydrogen utilizing devices, such as metal hydride batteries, and more specifically, relates to such devices having a hydrogen storage capacity for providing passive purification of a hydrogen stream which passively and automatically regulates and inhibits fluid flow of water vapor when the device is inactive.

2. Background Art

Metal hydride electrochemical fuel cells are in serious consideration as the next generation power source for providing storing and providing electric power to automobile and to other zero emission power storage and generation applications. Several innovative techniques have been described for storing and obtaining electrical power from electrochemical cells utilizing the combining reaction of hydrogen with oxygen to produce water and like combining reactions.

A major consideration for electrochemical cells utilizing hydrogen as reactant is the necessity of storing the hydrogen and providing and maintaining a clear, undiluted supply of hydrogen gas for use in the electrochemical reactions. For a detailed discussion of the background and considerations which enter into choosing components of an electrochemical battery system, and the requirements for such a system which utilizes a hydrogen storage capacity, reference is made to commonly assigned U.S. Pat. No. 5,532,074, the teachings of which are incorporated herein by reference.

A key consideration in avoiding material deterioration or decomposition of the components of the hydrogen storage system is the elimination of impurities, such as oxygen or water vapor, from the hydrogen gas stream delivered to the metal hydride storage material. Various methods have been proposed tending to inhibit or eliminate contact of oxygen or water vapor with the metal hydride hydrogen storage materials.

U.S. Pat. No. 5,128,219 describes an electrode protection mechanism for inhibiting contact of the metal hydride, hydrogen-storing negative electrode with the oxygen gas generated during the electrolytic reaction. In another method described in U.S. Pat. No. 5,250,368, the metal hydride storage material is isolated from the battery cell housing. However, even when isolated from each other, the electrochemical reaction in the battery cells produces sufficient water vapor that becomes entrained in the hydrogen gas stream to cause water vapor to reach the metal hydride and to release oxygen atoms when the hydrogen atoms are absorbed by the metal hydride material. The oxygen atoms tend to form oxides on the surface of the metal hydride material, causing "corrosion" of the surface and deterioration of the ability of the hydride material in sorbing hydrogen atoms. Thus, inhibiting contact of water vapor and/or oxygen with the metal hydride is an important consideration.

One solution to this difficulty has been proposed in U.S. Pat. No. 5,250,368. That proposal is to include certain elements in an in-line piping network between the hydride storage vessel and the electrochemical cell chamber or housing which are designed to purify and filter out the entrained water vapor and oxygen from the hydrogen stream passing through the in-line piping network or other gas communication means. A molecular sieve material is proposed which has a strong affinity for water vapor, but does not absorb hydrogen readily. During the charging of the battery, hydrogen gas is generated and flows from the battery charger through the in-line piping network to the metal hydride container. The molecular sieve material is contained within the in-line piping network and absorbs and removes the water vapor from the hydrogen stream down to a very low vapor pressure, on the order of 1 to 10 ppm before it reaches the hydrogen storage material.

During battery discharge, hydrogen gas leaves the metal hydride container and passes back through the in-line piping and the molecular sieve material. However, to evaporate the water in the molecular sieve material, electrical heating to about 250° C. is required. At this temperature, the molecular sieve material cannot "hold" very much water and, therefore, rejects the water vapor back into the hydrogen stream, and rehumidifies the hydrogen stream before it (the $H_2$ stream) enters the $Ni/H_2$ battery cell. Since the purification mode used here requires external electrical energy for molecular sieve heating to "regenerate" the water vapor, it is considered an "active" purification process.

A passive water vapor filtering system, disclosed and claimed in commonly assigned U.S. Pat. No. 5,537,074 "filters" out the water vapor or oxygen impurities from the passing hydrogen gas stream. The water molecules are described as collecting on the surface of a film of filter material so that the impurities are not allowed to pass through to the metal hydride hydrogen storage material when the system is charging. During discharge, when the hydrogen gas is passing in the opposite direction, the water vapor "evaporates" and once again becomes entrained in the hydrogen gas stream.

Still another method of passive "filtering" of water vapor from a passing hydrogen gas stream is described in U.S. Pat. No. 4,343,770. One section of a communication means (filter unit) includes an adsorbent, selected from the group consisting of molecular sieves, alumina, charcoal and silica gel, to adsorb the water from a stream of hydrogen gas passing through the filter unit. When the hydrogen gas is discharged from the storage facility, it passes through the adsorbent thereby cleaning the adsorbent of water impurities and the hydrogen gas is then used where the impurities, such as water vapor, are immaterial, e.g., in a battery cell.

Passive purification of a hydrogen stream utilizing a water vapor absorbent material mixed together with a powdered metal hydride material is the subject matter of the related invention described in aforementioned U.S. patent application Ser. No. 08/673,104, filed Jul. 1, 1996, now U.S. Pat. No. 5,688,611. The present invention may be utilized with the passive purification system taught therein. Conversely, the present invention may be utilized with one hydrogen utilization system, as described above, or any other system which requires maintaining the hydrogen storage means separated from the hydrogen utilization system and for which a hydrogen stream without entrained impurities is desired. For example, the arrangement of the present invention is applicable in a hydrogen utilization system in which an extremely pure, i.e. vapor free, hydrogen stream is required, e.g., for use in an extra terrestrial atmosphere as will explained below.

Passive purification is most effective for enabling water vapor removal from a hydrogen stream during continuous operation of the fuel cell or device which consumes hydrogen. However, use of a fuel cell is continuous under conditions when it is either charging or discharging, without any downtime between the two operations when the hydrogen gas operations are dormant. During these dormant periods, the hydrogen gas pressure in the fuel cell chamber is equal or substantially equal to the hydrogen gas pressure in the metal hydride chamber, and essentially no hydrogen flows between the chambers.

The problems which develop from use of a system that is not continually either charging or discharging, i.e., when the system as a whole is in an equilibrium condition is that for an aqueous based utilization, such as a hydrogen fuel cell, water vapor develops within the enclosed chamber by evaporation from the fuel cell. A partial water vapor phase results within the hydrogen gas in the system and as a result of Brownian motion, the water vapor becomes dispersed throughout the hydrogen gas even when no hydrogen gas flow is present. For an arrangement without valves disposed between the two enclosed portions of a system, water vapor develops a uniform partial pressure that reaches the metal hydride/water absorbent mixture, and continually provides a partial pressure of water vapor over long dormant periods, until the system again begins hydrogen operation while either the charging or discharging the system.

During periods of equilibrium, when water vapor has permeated throughout the system, continual exposure of the surface of the metal hydride material to the water vapor causes the hydride material to react with the oxygen atoms in the water vapor to deteriorate the surface sorbing ability of the metal hydride. Even when used in a mixture with water sorbent materials, as taught in related U.S. Pat. No. 5,688,611, the continual exposure of the hydride surface to water vapor, coupled with the eventual water saturation of the water sorbent material by continual exposure to the water vapor, renders the system unable to continue optimal performance for hydrogen storage after a few cycles.

What is considered necessary to the industry is a system having an efficient and long-lasting metal hydride battery hydrogen storage means, which includes a means for inhibiting free travel of water vapor between the hydrogen storage means and the hydride battery cell, or other hydrogen utilization means during periods of inactivity of the system, when no hydrogen flow is present.

SUMMARY OF THE INVENTION

Accordingly, this invention describes and claims a segmented metal hydride battery system comprising the following elements: a containment can, a stack of hydrogen-metal oxide cells, defining a hydrogen-metal oxide battery, disposed within the containment can, a hermetically enclosed hydrogen storage chamber having at least one aperture and containing a metal hydride material for retaining and storing a concentrated volume of hydrogen, the metal hydride material being capable of releasably absorbing and discharging gaseous hydrogen, and the metal hydride material comprising a mixture of water vapor absorbing particles and metal hydride particles in a predetermined range of proportions, a communication means having at least one aperture and disposed between the hydrogen-metal oxide battery and the enclosed hydrogen storage chamber for permitting reversible communication of a hydrogen gas stream flow between the battery and the chamber, a means for selectively opening and closing the communication means to selectively permit and restrict hydrogen gas flow between the hydrogen-metal oxide battery and the enclosed hydrogen storage vessel through the aperture during a dormant period. The water vapor adsorbing particles preferably comprise a desiccant, such as silica gel or molecular sieve powders.

BRIEF DESCRIPTION OF THE DRAWINGS

FIG. 1 illustrates a schematic cross-sectional view of a segmented hydride battery system lacking any means for inhibiting passive absorption of water vapor during non-operational states of the battery system.

FIG. 2 illustrates a schematic cross-sectional view of a segmented hydride battery according to the present invention.

DETAILED DESCRIPTION OF THE PREFERRED EMBODIMENT

Figure 3:
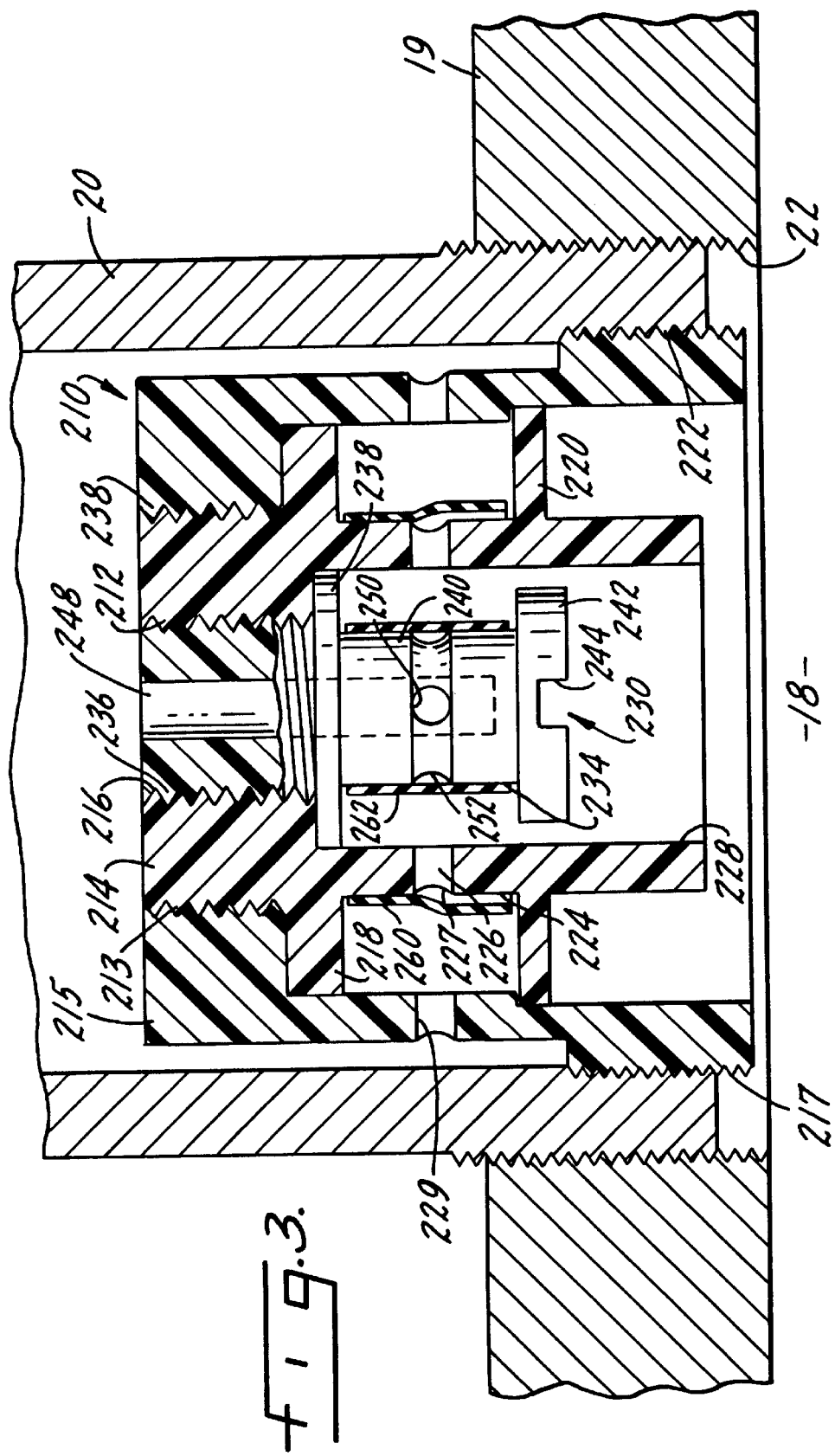
FIG. 3 illustrates a schematic cross-sectional view of an alternative embodiment of the present invention.

The invention herein utilizes a structure and system as described, illustrated and claimed in aforementioned U.S. Pat. No. 5,688,611, filed on Jul. 1, 1996, which is herein incorporated by reference where appropriate.

The basic metal hydride battery structure is illustrated by the schematic diagram in FIG. 1. Although described with reference to use in a metal hydride battery system, the hydrogen utilization portion of the system may comprise any of a number of other applications, such as a hydrogen combustion engine or a utility electrical energy storage battery (not shown). The storage portion and inventive dual one-way check valve, described and claimed herein, remains essentially the same, regardless of the end use. Alternatively, a number of inventive dual check valves may be utilized to accommodate greater volumes of hydrogen gas flow.

In the battery and hydrogen storage system 10, a nickel-hydrogen battery 12, having a positive electrode 14 and a negative electrode 16, provides for electrical connection to the environment external the system. The precise construction of the battery is not overly significant; the cell 12 may be conventional or may be of special construction. It should be appreciated that the only requirement is that the electrochemical reaction required for operation of the cell utilizes hydrogen gas and generates hydrogen gas during discharge of the battery cell.

Any type of metal-hydride battery cell may utilize the teachings of this invention. For a general discussion of these types of cells, which utilize hydrogen as the energy imparting medium, reference is made to U.S. Pat. No. 5,532,074, which is commonly assigned with this invention, and is incorporated herein by reference. For non-battery applications, the battery 12 may be replaced by another hydrogen utilization device (not shown) which requires a steady supply of hydrogen gas during operation.

The electrochemical battery 12 is in fluid communication with the other elements of the system, such as a hydrogen storage chamber 18, delivered by a housing wall 19, through a hermetically sealed piping means 20. Preferably, piping means 20 provides fluid communication throughout the complete system 10, connecting all of the elements in an in-line connection. The in-line connection defined by piping means 20 provides a hydrogen gas transmission path through the system, and permits hydrogen gas communication between the different portions of the system 10.

Alternatively, the hydrogen storage means may be disposed within a unitary battery cell system housing (not shown). These type of systems are similar to the one shown schematically in FIG. 1, in that they require a separation means, such as a gas tight enclosure, between the hydrogen storage means and the battery, in for example, a battery system of the type illustrated and described in commonly assigned U.S. Pat. No. 5,532,074 (FIG. 2 thereof). Such a battery system has a separation plate disposed between adjacent battery and hydrogen storage chambers and a plate aperture in the plate so that it may also utilize the features of the present invention. The inventive dual one-way check valve may be disposed within the plate aperture, as is described below.

Preferably, a compressed spring mechanism 24 provides a fluid passage for speedier dispersal of the hydrogen gas throughout the hydrogen storage material, as is taught by commonly assigned U.S. Pat. No. 4,396,114, incorporated by reference herein. The important features of the present invention are utilizable in any metal hydride system where an aqueous solution is exposed to the hydrogen gas and is subject to developing a partial pressure therein, and where the "wet" hydrogen is free to come into contact with the metal hydride disposed within the metal hydride system.

The hazards of not utilizing a valve to cut off the hydrogen communication between the two portions of the system, the hydrogen storage and the hydrogen utilization means, is schematically illustrated in FIG. 1. The hypothetical system schematically illustrated in FIG. 1 does not include a valve or other restriction in the piping 20 between the battery 12 and the hydrogen storage chamber 18.

Lack of such a valve or restrictor permits the partial pressure of the water molecules, identified in FIGS. 1 and 2 by identification numeral 28, to reach a partial pressure equilibrium throughout the system 10, including within the hydrogen storage chamber 18. The partial pressure of the water is essentially uniform throughout the system 10, and is represented by the density of the dots 28 representing water molecules. The hydrogen atoms are absorbed by the metal hydride 50 and the oxygen atom remains as an oxide on the surface of the metal hydride particles. Conversely, if a desiccant material is used, as taught by aforementioned U.S. Pat. No. 5,688,611, the desiccant material absorbs the water molecules in the chamber 18, preferably before the water molecules can react with the metal hydride material.

The water vapor molecules are depleted by absorption within the hydride or desiccant materials within the hydrogen chamber 18. Additional water molecules are dissipated by evaporation into the chamber 18 through the piping 20 to bring the partial pressure of the water vapor back into equilibrium. This process is slow, but is continuous, and will proceed as long as water is exposed to the hydrogen gas contained in the battery 12 and desiccant material is not saturated and the oxide has not formed over all the available metal hydride surfaces. Saturation of the hydrogen storage system with water would impede further hydrogen absorption, and the water vapor would thus achieve a true equilibrium throughout the system 10, albeit at the expense of the ability of the hydride material to sorb hydrogen.

However, in the long term, and after repeated and prolong exposure to water vapor, the metal hydride material necessarily deteriorates and the reduction in hydrogen adsorbing capacity affects the performance and continued use of the batter system 10 over a great number of cycles. As a further refinement to the invention described herein, it is considered preferable for long term effectiveness and continued use to utilize a combination of a water vapor absorbing desiccant material particles in conjunction with a film on the metal hydride particles which is water and carbon dioxide repellant, in accordance with the teachings of the parent U.S. Pat. No. 5,532,074.

Irrespective of the application or configuration used, the system 10 preferably includes a means to selectively open or close fluid communication through the aperture 22 between the battery cell and the hydrogen storage means. As shown in the aforementioned U.S. Pat. No. 5,688,611, for example, the piping means provides an in-line communication means between the battery 12 and the hydrogen storage means 18, and includes a valve to selectively open and close gas communication in the piping means 20 between the cell housing 12 and aperture 22 adjacent the hydrogen storage chamber 18.

An optional heat exchanger (now shown) may be provided in-line in the piping means 20 to cool off the gaseous hydrogen which is being transmitted to the battery cell 12 during a discharge step of the battery and hydrogen storage system. Another optional element in the system, also in-line with the piping means 20, may be a catalytic converter (not shown) for converting oxygen molecules, in combination with hydrogen from the gaseous stream, into water. Stray oxygen molecules may find their way into the system 10, even if it is hermetically sealed, as a result of the electrolytic reaction which occurs in the battery cell 12. More detailed description of the these optional elements may be found in U.S. Pat. No. 5,250,368, which is incorporated herein by reference. Although described with reference to inhibiting water vapor migration into the hydrogen storage chamber 18, the present invention also acts to inhibit migration of oxygen or other gas impurities during periods when the system is dormant.

The metal hydride battery system according to this invention includes a unique and innovative valve for minimizing the amount of water vapor which may migrate into the hydrogen storage portion, such as chamber 18, during inactive periods of the metal hydride system 10. The valve, however, does not impede the normal flow of hydrogen gas between chamber 18 and battery 12 during normal operation of the system 10, when the battery fuel cell is either charging or discharging and hydrogen gas flow is effected. Two embodiments 110 and 210 of such a valve, referred to herein as a dual one-way valve, are illustrated in each of FIGS. 2 and 3. These embodiments will be described below with reference to each drawing figure.

Referring now to FIG. 2, an inventive metal hydride system 110 is illustrated. Most of the elements of the system are identical to the elements illustrated and described with reference to FIG. 1, and identical identification numerals are used to identify identical elements in FIG. 1, and also in aforementioned U.S. Pat. No. 5,688,611. The major difference in the inventive system 110 is the disposition within the in-line fluid communication means path of a dual one-way check valve 30, as shown. The embodiment of the dual one-way check valve 30 illustrated in FIG. 2 is simpler to describe in terms of operation. The embodiment shown in detail in FIG. 3 performs the same functions, albeit in a slightly different way. Other methods of providing the functions of a dual one-way check valve may become apparent to those skilled in the art upon achieving an understanding of the present invention.

Check valve 30 is termed a dual one-way check valve because it comprises two one way conical check valves 32,34, which each permit hydrogen gas flow in only a single direction, e.g., either from the chamber 18 to the battery 12, or vice versa, and only when a hydrogen gas stream is developed by a large pressure differential across valve 30.

The two conical check valves 32,34 are oriented in opposite directions, so that a difference in pressure will cause the gas to flow from one side of the dual check valve 30 to the other, irrespective of the direction of hydrogen gas flow. Each check valve 32,34 comprises a restricted end 40 and a divergent end 42.

A one-way check valve is conventional in other applications. It is generally disposed in a fluid communication means, such as a pipe, and operates to permit fluid communication across the check valve only when the pressure on the fluid receiving side is significantly greater than the pressure on the fluid transmitting side. In the event that the pressure is reversed, the check valve automatically closes due to the pressure, and does not permit fluid flow across the check valve.

Each one way valve 32,34 is simple in operation and structure. The valves 32,34 are essentially identical to each other, albeit oriented in different directions. The in-line piping 20 is hermetically connected by two T-joints 36,38 to the dual check valve arrangement 30. A first section 36' of the T-joint 36 is connected to the restricted end 40 of conical one way valve 32, and the other section 36" of T-joint 36 is connected to the divergent end 42 of the check valve 34.

At the opposite in-line end of the dual check valve arrangement, first portion 38' of T-joint 38 is attached to the divergent end 42 of check valve 32. The other portion 38" of check valve 38 is attached to the restricted end 40 of check valve 34. Hydrogen gas is free to flow through the one-way valves except under conditions which require restriction of that hydrogen flow, as will be explained below.

Each one way valve 32,34 includes a restrictive member, such as a spherical ball 44, which may travel between the valve restricted end 40 and the restricted end 40. When at the divergent end 42, ball 44 effectively and annularly engages the inside of the conical surface of the valve to create a seal and restrict hydrogen flow. Each valve 32,34 further comprises a means, such as a spring member 46, which biases each ball 44 away from the divergent end 42 and toward the restricted end 40, in order to maintain the effective seal. The biasing force provided by the spring member 46 is selected to be sufficiently strong to maintain the seal even in the event of predetermined threshold pressure differential, on the order of about 1 to about 5 p.s.i. However, if the pressure differential exceeds this threshold pressure, then the ball 44 of one of the one way valves 32,34 is pushed away from the restricted end 40, thereby breaking the seal and hydrogen gas flow from the higher pressure chamber to the lower pressure chamber. Using two one way valves 32,34 oriented in opposite directions thus effectively passively closes off hydrogen gas flow in either direction unless the pressure differential across the dual check valve arrangement 30 exceeds the threshold pressure.

A dual check valve arrangement 210, such as that shown in FIG. 3, is an alternative embodiment of this invention. The arrangement 210 provides a compact configuration which may be inserted into the communication line through which the hydrogen stream passes.

The check valve arrangement 210 may include threaded connection means for engaging an aperture within the in-line piping of the hydrogen stream path. For example, the arrangement 210 may be threaded onto a threaded bore of the piping, such as bore 222, and the piping may threadably engage threaded bore 22 in the chamber wall 19. The piping 20 may also include a threaded collet or other means of hermetically sealing and including the dual check valve arrangement 210 in an in-line path between the hydrogen storage means 50 (FIG. 1) and the battery 12 (FIG. 1). The dual check valve arrangement 210 may be miniaturized for insertion within the piping of a system, and it is contemplated that the diameter of the check valve arrangement 210 and of bore 22, shown in FIG. 3, may be as small as ¼ inch. Nesting of a one way valve within a second one way valve enables a saving in space.

Dual check valve arrangement 210 may be integral, or may comprise several pieces, as shown, which may engage each other through threaded engagement of threads 212,213 as shown in FIG. 3. The dual check valve 210 comprises a mounting member 215, which includes threads 217 for engaging bore 222 of the wall 19. The dual check valve 210 provides a restriction which impedes easy hydrogen gas flow from one chamber to the other of system 210 unless the operational characteristics of the system create a predetermined pressure differential across the restrictor, i.e., across the dual check valve 210.

The dual check valve 210 comprises an axially extending support essentially in the form of a tubular body 214 having a threaded central aperture 216, and two laterally extending annular flanged members 218, 220 defining an outer cylindrical surface 224 between them. At least one radial bore 226 opens to an annular indent 227 disposed circumferentially about the cylindrical surface 224. At the inner diameter of the bores 226, opening to the inner cylindrical surface 228 of the tubular body 214 provides fluid communication through body 214. Aperture 216 extends axially along the inner tubular cylindrical surface and is threaded to receive a valve insert member 230.

Insert member or insert 230 comprises a cylindrical axially oriented post having an outer surface 234. The insert 230 is hermetically sealed within the support member bore 216 at a threaded engagement between threads 236 disposed at one end of the insert outer cylindrical surface 234, and the threads 212 of bore 216.

Insert 230 further comprises an annular central flange 238 which axially separates the threads 236 from an unthreaded portion 240 of the insert cylindrical surface 234. A terminal head 242, having a slotted groove 244, provides for tightly screwing the threaded insert 230 into the threaded bore 216. The complete screwing of the insert 230 into the bore 216, until the annular flange 238 engages a radial wall stop disposed on support member 214, thereby sealingly engages the insert 230 within the bore 216 to provide a hermetic seal, such that hydrogen gas flow would be essentially eliminated through the threaded engagement.

Insert 230 further comprises an axially extending central bore 248 which extends from the insert end having the threads 236 to at least one radial through bore 250, such as throughbore 250 illustrated in FIG. 3. Central bore 248 and the through bores 250 provide hydrogen gas communication to an annular indent 252 disposed around the circumference of the unthreaded portion 240 of the insert surface 234.

Both indent 252 and 227 are disposed within two smooth, unthreaded surface portions 240,224 of the insert 232 and of the support member 214, respectively. Each of these surface portions 240,224 are able to support a flattened elastomeric band or belt which covers both the surface portions 240,224 and the indents 252,227. Annular flanges 218,220, defining surface 224, and annular flange 238 together with terminal head 242, defining the surface 240, maintain the position of the elastomeric bands.

A first elastomeric band 260, having a diameter slightly smaller than that of surface 224, is disposed to separate in-line pipe 20 and battery 12 from the indent 227. At least one bore 229 is disposed in the wall of mounting member 215 to allow hydrogen gas flow to the in-line pipe 20. A second elastomeric band 262 separates and restricts communication between the indent 252 and the chamber 18, disposed within the hydrogen storage means housing 19.

Hydrogen gas communication is substantially prevented between the indents 252,227 and the chamber on the opposite sides of the respective elastomeric bands 260,262, under conditions where very little or no pressure differential across the band 260,261 exists, under a predetermined threshold pressure.

Bores 226 opening out to the indents 227 are similarly covered by the elastomeric band 260 which inhibits the hydrogen gas from communicating between chambers unless the pressure exceeds a certain predetermined threshold pressure differential. When the pressure differential exceeds such a predetermined threshold, either elastomeric band 260 or 262 will deform to permit hydrogen communication across the elastomeric bands depending on whether there is an increase of pressure within the chamber 18 or within the piping 20. For example, if the hydrogen pressure is greater within the chamber 18, e.g., when the system 10 is charging, a fluid path for hydrogen gas will open across the elastomeric band 260, as shown in FIG. 3. The fluid communication and hydrogen gas flow will continue until the pressure differential is reduced below the threshold predetermined value. That event will cause the natural resiliency of the elastomeric band 260 to revert to its original shape covering the indent 227, thereby blocking further egress from the chamber 19 toward the pipe 20.

In the opposite case, where the chamber pressure in the chamber 18 is less than that in the pipe 20, which occurs when the battery (12, FIG. 1) is discharging and thereby generating hydrogen gas, the elastomeric band 262 changes shape to permit inflow of the hydrogen gas into the hydrogen storage means in the chamber 18 from the in-line piping 20. When the charging procedure is completed, and no more hydrogen is being generated, the inflow of hydrogen causes the pressure within the piping 20 to become essentially equalized to the pressure in the chamber 18. Thus, the restriction caused by the dual check valve arrangement 210 becomes complete, and as the battery enters a dormant or inactive stage, the pressures are maintained at a rough equilibrium. Simultaneously, the "wet" hydrogen gas, emanating from the battery 12, is prevented from coming into contact with the hydrogen storage material 50.

The predetermined threshold pressure differential is dependent on a number of factors, such as the thickness, material, length and tautness of the elastomeric bands 260, 262. Judicial selection of these and other parameters will optimize and standardize the threshold pressure so that excessive pressure does not build up in either chamber. Optimum selection of parameters also avoids transient or spurious transitional pressure differential from causing hydrogen gas to freely flow back and forth between the chambers. A threshold differential pressure of about 1–2 p.s.i. is considered optimum for most applications.

The particular materials for either dual check valve arrangement 110 or 210 may be metallic, ceramic or plastic materials. However, the preferable materials of the rigid parts for arrangement 110 is metallic valve walls and a plastic or elastomeric ball 44 to effect the seal between the ball and the conical wall. The spring 46 may comprise stainless spring steel having apertures for easy flowthrough of the hydrogen gas. For dual check valve arrangement 210, the solid materials preferably comprise Actron GP, sold under the trade name DELRIN, and available from D.S.M. Engineering Plastics of Reading, Pa. The material for the elastomeric bands 260,262 is preferably an elastomer, such as that used for surgical procedures.

In operation, the systems 10 and 12 have three modes, a charge mode, a discharge mode and an inactive or dormant mode. The dual check valve arrangements 110,210 are open during the charge and discharge modes to permit hydrogen gas communication between the battery cell 12 and the hydrogen storage chamber 18, as explained above. During the charge mode, electrical energy imparted from an outside source, e.g., an electrical charger connected to the electric grid, or to a solar panel providing an electric current directly to the electrodes 14,16 of the cell, causes the cell to drive the reverse electrochemical reaction and to generate hydrogen gas. This hydrogen gas develops a higher pressure, and when the pressure exceeds the threshold, the hydrogen gas flows into the chamber 18. For a more complete, detailed description of the equilibrium electrochemical reaction in a metal hydride battery, reference is made to U.S. Pat. No. 5,532, 074, the teaching of which is incorporated herein.

The charging reaction depends on electrical current to generate hydrogen gas from water, and that hydrogen generation increases hydrogen gas pressure in the system so that the metal hydride particles 50 in the hydrogen storage chamber 18 is forced to adsorb the hydrogen gas. When a sufficient amount of gas is adsorbed, the system is said to be charged. When the positive driving force of the electrical energy ceases charging the battery 12 and no longer generates hydrogen gas, the pressure in the system approaches equilibrium. When the pressure differential drops below the threshold, the dual check valve arrangement, either 110 or 210, automatically and passively closes, and no hydrogen gas flow between the pipe 20 and the chamber 18 is permitted.

Upon shutting the valve arrangement 110 or 210, a double equilibrium for hydrogen gas pressure is achieved. In the electrochemical cell chamber 12, disconnection of the electric energy source from contact with electrodes 14, 16 no longer drives the hydrogen generating electrochemical reaction. The hydrogen gas pressure in the cell chamber thus decreases due to a phenomenon known as self discharge. The electrodes 14, 16 come into contact with stray ions which cause some electrical discharge and which cause the reverse reaction, which consumes hydrogen gas, to deplete the hydrogen in the chamber until a point where equilibrium is achieved.

On the other hand, a much higher pressure equilibrium is achieved within the hydrogen storage chamber 18. At the time the valve 110 or 210 is shut, the system 10 is at an approximately uniform pressure, with the hydrogen gas flowing from the electrochemical cell to the hydride material 50. As the hydride material continually adsorbs the hydrogen, a capacity plateau is reached. When reaching the plateau, the hydride material no longer can adsorb more hydrogen because hydrogen capacity has been reached for that specific pressure. Additional hydrogen pressure may not be available, thus the system 10 has reached an equilibrium point. At that point, the hydrogen gas pressure in the chamber 18 is maintained at a constant level for those particular conditions. After gas pressure equilibrium is reached in both chambers 12 and 19, the valve 110 or 210 isolates a gas pressure in chamber 18 which is significantly higher than in the electrochemical cell chamber 12. As soon as the electrochemical reaction in cell 12 again proceeds, whether because of self-discharge or because electrical energy is drawn off from the electrodes 14,16, the drop in hydrogen gas pressure due to hydrogen consumption automatically causes one of the valves in the dual one way valve arrangement 110 or 210 to open and permit hydrogen to flow from the hydride chamber toward the battery 12.

When the user draws upon the system 10 to provide electrical power, contact is first effected to the electrodes 14, 16 and the valve 110 or 210 is opened. As hydrogen reaches the battery cells, electricity is generated and hydrogen is consumed, thereby reducing the gas pressure in the cell housing 12. As gas pressure is reduced, hydrogen flows from the hydrogen storage chamber 18 to the cell housing 12, continuing to drive the electrochemical reaction and thereby continually producing electric current. When the hydrogen gas reaches a new equilibrium because no more is available in the metal hydride material in chamber 18, the system 10 is considered discharged, and it must be recharged for the next cycle.

Other embodiments of this invention would become obvious to a person of ordinary skill in the art once a full appreciation of the features of the present invention are understood. One such modification is replacement of the nickel hydrogen electrochemical portion of the system with other types of electrochemical batteries, such as Manganese Oxide or Silver Oxide batteries, or by a fuel cell, and especially a regenerative fuel cell.

What is claimed is:

1. A segmented metal hydride hydrogen gas storage system comprising:
   a) a hermetically enclosed containment can;
   b) an apparatus which consumes hydrogen gas in a reversible electrochemical reaction, said apparatus being disposed within the containment can;
   c) a hydrogen storage chamber having at least one means for fluid communication between said hydrogen storage chamber and said apparatus and being otherwise hermetically sealed from said apparatus, said hydrogen storage chamber containing a metal hydride material, capable of releasably absorbing and discharging gaseous hydrogen and for retaining and storing a concentrated volume of hydrogen;
   d) a dual one way valve means disposed within each said at least one fluid communication means between said apparatus and said enclosed hydrogen storage chamber, said dual one way valve means permitting reversible communication of a hydrogen gas stream flow between said battery and said chamber in one direction at any particular time, said fluid communication direction depending on the pressure differential across said dual one-way valve being greater than a predetermined threshold pressure.

2. The arrangement according to claim 1 wherein said metal hydride material further comprises vapor absorbing particles and metal hydride particles in a predetermined range of proportions.

3. The hydrogen gas storage system according to claim 2 wherein said ratio by weight of water absorbing particles to metal hydride particles is approximately 1 to 20.

4. The hydrogen gas storage system according to claim 1 wherein said water vapor absorbing particles comprise a desiccant material.

5. The hydrogen gas storage system according to claim 1 wherein said electrochemical device comprises an electrolyzer and fuel cell or a regeneration fuel cell.

6. The hydrogen gas storage system according to claim 1 wherein said apparatus consuming said hydrogen gas comprises a hydrogen-metal oxide battery.

7. The hydrogen gas storage system according to claim 1 wherein said dual check valve arrangement comprises two frusto-conical shaped chambers, each one having a constricted end and a divergent end, and each including a ball that is axially movable between said two ends, and a biasing means biasing said ball toward said constricted end, the amount of bias provided by said bias means defining said predetermined threshold pressure necessary to open said one way check valve to hydrogen gas flow.

8. The hydrogen gas storage system according to claim 1 wherein said dual check valve arrangement comprises a nested configuration, a first one of said check valves being disposed radially outwardly of a second one of said check valves.

9. The hydrogen gas storage system according to claim 1 wherein said check valves each comprise a cylindrical surface having at least one dent to which opens at least one radially extending throughhole communicating between said hydrogen storage chamber and said hermetically enclosed containment can, each of said cylindrical surfaces supporting an elastic resilient band covering said at least one said throughhole and dent, such that establishing a pressure differential between said chamber and said can deforms said resilient band to permit fluid communication in one direction across one of said valves when the pressure is greater in the chamber, and to permit fluid communication in the other direction across the other of said valves when the pressure is greater in the can.

* * * * *